J. A. GRANSTROM.
ANTISKIDDING TIRE ATTACHMENT FOR WHEELS.
APPLICATION FILED DEC. 26, 1916.
1,234,538. Patented July 24, 1917.
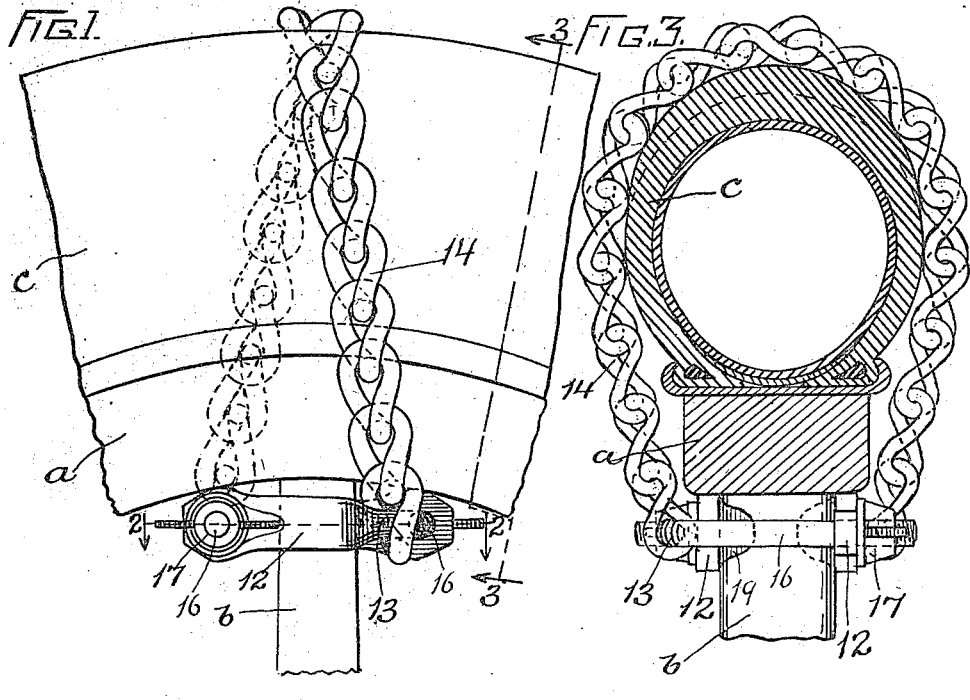
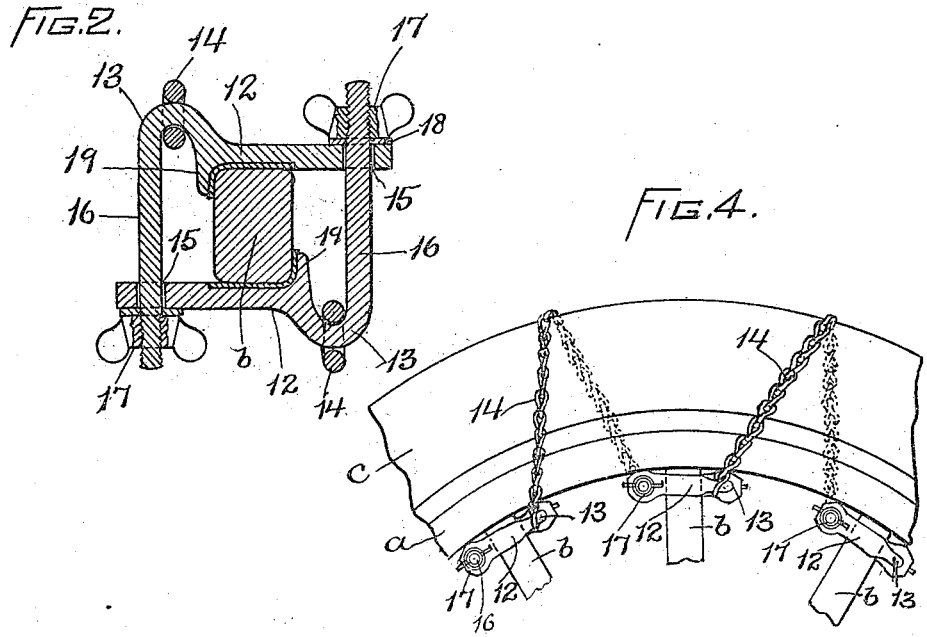
INVENTOR:
J. A. Granstrom
by Wright Brown Quinby May
ATTY'S.

UNITED STATES PATENT OFFICE.

JOHN A. GRANSTROM, OF EVERETT, MASSACHUSETTS.

ANTISKIDDING TIRE ATTACHMENT FOR WHEELS.

1,234,538.  Specification of Letters Patent. Patented July 24, 1917.

Application filed December 26, 1916. Serial No. 138,725.

*To all whom it may concern:*

Be it known that I, JOHN A. GRANSTROM, a citizen of the United States, residing at Everett, in the county of Middlesex and State of Massachusetts, have invented new and useful Improvements in Antiskidding Tire Attachments for Wheels, of which the following is a specification.

This invention relates to an anti-skidding attachment which includes a cross chain extending across the tread of a cushion or pneumatic tire on the wheel, and means for anchoring the ends of the chain to a spoke of the wheel, a plurality of attachments being required to completely equip a wheel, each of the cross chains being independent of the others.

The invention is embodied in the improvements which I will now proceed to describe and claim.

Of the accompanying drawings, forming a part of this specification,—

Figure 1 is a fragmentary side elevation, showing a portion of the wheel and a tire thereon equipped with an attachment embodying the invention.

Fig. 2 is a section on line 2—2 of Fig. 1.

Fig. 3 is a section on line 3—3 of Fig. 1, and an elevation of the parts at the left of said line.

Fig. 4 is a view similar to Fig. 1, illustrating a modification.

The same reference characters indicate the same or similar parts in all of the figures.

In the drawings,—*a* represents a portion of the felly, *b* a portion of one of the spokes, and *c* a portion of the tire of a vehicle wheel, the tire as here shown being an ordinary pneumatic tire, although my improved attachment may be used with any form of yielding or elastic tire.

In carrying out my invention, I provide an anti-skid chain-holder comprising a pair of jaws 12, formed to bear on opposite sides of a spoke *b*, each jaw having an outwardly projecting chain-engaging member 13, means being provided for confining the jaws in clamping engagement with the spokes, the members 13 being arranged to project from opposite sides of the wheel and to engage the ends of a cross chain 14, extending across the tread of the tire *c*.

In the embodiment of my invention here shown, each jaw 12 is provided at one end with an orifice 15, and at the opposite end with a shank which is bent to form a U-shaped neck constituting the said chain-engaging member 13, and a bolt 16 screw-threaded at its outer end, and connected by said neck with the jaw, the bolt of each jaw being adapted to pass through the orifice 15 of the other jaw, as shown by Fig. 2, the bolts 16 extending substantially at right angles with the jaws and the chain-engaging members or necks 13 being arranged to project outwardly from opposite sides of the wheel, as indicated by Fig. 3.

With the threaded end of each bolt 16 is engaged a clamping nut 17, said nuts being arranged to bear on the outer sides of the jaws 12, or on locking washers 18 interposed between the nuts and jaws. When the nuts are turned inwardly on the bolts they confine the jaws in clamping engagement with the spoke *b*.

The jaws are formed to closely fit the opposite sides of the spoke and are preferably provided with ears 19, formed to bear on the intermediate sides of the spoke, as shown by Fig. 2, and prevent endwise displacement of the jaws.

The end links of the chain 14 may be readily slipped upon the bolts 16 and into engagement with the necks 13 when the nuts are removed from the bolts and the bolts are separated from the jaws. When the parts are assembled, as shown by the drawings, the outwardly projecting necks 13 hold the chain out of contact with the felly *a*, as shown by Fig. 3.

It will be seen by reference to Figs. 1 and 2, that the relative arrangement of the necks 13 is such that the chain 14 extends obliquely across the tire, this oblique arrangement of the chain being desirable, because it prevents the chain from slipping laterally in the direction of the length of the tire, and increases the effective length of the chain.

Each jaw 12, neck 13 and bolt 16 is preferably made as a single integral piece, and each of said pieces is a duplicate of the other, so that the jaw may be conveniently assembled and secured to the spoke.

It will be seen that I have provided a spoke-engaging and chain-anchoring attachment comprising two duplicate substantially L-shaped members, each composed of a jaw portion 12, having an orifice 15 at one end, anw formed at its inner side to bear on one side of a wheel spoke, a U-shaped chain-engaging neck 13 offset from the outer side of the jaw portion, and a bolt portion 16 joined at one end to said neck, formed to pass through a chain link and threaded at its opposite end, said bolt and jaw portions being substantially at right angles with each other, and clamping nuts 17 engaged with the threaded ends of the two bolt portions. In assembling said members they are moved toward each other from opposite sides of a spoke, and the bolt portion 16 of each is inserted in the orifice 15 of the other, after being passed through an end link of the chain 14. The assembled members form a substantially rectangular frame surrounding the spoke, the jaw portions 12 forming two opposite sides of said frame and being movable toward each other, by adjustments of the clamping nuts, to engage the spoke. The necks 13 form diagonally opposite corners of the frame and are offset outwardly from the frame, so that they project from opposite sides of the wheel, as indicated by Fig. 3.

The location of the necks 13 at diagonally opposite corners of the frame not only enables a chain 14 engaged with the two necks of one attachment, as shown by Figs. 1, 2 and 3, to extend obliquely across the tire, but also enables one end of the chain to be engaged with an attachment on one spoke, and the opposite end with an attachment on the next spoke, as shown by Fig. 4, without requiring an objectionable elongation of the chain. This is because the distance between the necks 13 of the two attachments on adjacent spokes is reduced to the minimum by the location of the necks at diagonally opposite corners of the frame-shaped attachments, hence the chain, while extending obliquely across the tire, bridges a relatively short space between the spokes.

I claim:

1. An anti-skidding attachment for wheels, comprising a pair of jaws formed to bear on opposite sides of a spoke, each jaw having an outwardly projecting chain-engaging member, means for confining said jaws in clamping engagement with the spoke, said members projecting from opposite sides of the wheel, and a cross chain engaging said members, the relative arrangement of said members being such that the cross-chain extends obliquely across a tire.

2. An anti-skidding attachment for wheels, comprising a pair of jaws formed to bear on opposite sides of a spoke, each jaw having at one end an orifice, and at the opposite end a shank which is bent to form a U-shaped chain-engaging neck, and a screw-threaded bolt connected by said neck with the jaw, extending substantially at right angles with the jaw, and formed to extend through the orifice of the other jaw, the bolt of each jaw having a clamping nut seated on the other jaw, and a cross chain engaged with the U-shaped necks, said necks being relatively arranged to cause the chain to extend obliquely across a tire.

3. A spoke-engaging-and-chain-anchoring attachment for vehicle wheels, comprising two duplicate substantially L-shaped members, each composed of a jaw portion having an orifice at one end, and formed at its inner side to bear on one side of a wheel spoke, a U-shaped chain-engaging neck offset from the outer side of the jaw portion, and a bolt portion joined at one end to said neck, formed to pass through a chain link and threaded at its opposite end, said bolt and jaw portions being substantially at right angles with each other, and clamping nuts engaged with the threaded ends of the two bolt portions, the bolt portion of each member being insertible in the orifice in the jaw portion of the other member, in assembling the members, said members when assembled, forming a substantially rectangular frame surrounding a spoke, the jaw portions forming two opposite sides of said frame and being movable toward each other by adjustments of the clamping nuts to cause the engagement of the jaw portions with the spoke, the said necks forming diagonally opposite corners of said frame.

In testimony whereof I have affixed my signature.

JOHN A. GRANSTROM.